United States Patent
Brennan

(10) Patent No.: US 9,233,877 B2
(45) Date of Patent: Jan. 12, 2016

(54) PLASTER PATCHING COMPOSITIONS AND METHODS FOR MAKING AND USING SAME

(71) Applicant: Rory Brennan, Brattleboro, VT (US)

(72) Inventor: Rory Brennan, Brattleboro, VT (US)

( * ) Notice: Subject to any disclaimer, the term of this patent is extended or adjusted under 35 U.S.C. 154(b) by 0 days.

(21) Appl. No.: 14/211,820

(22) Filed: Mar. 14, 2014

(65) Prior Publication Data

US 2014/0261091 A1    Sep. 18, 2014

Related U.S. Application Data

(60) Provisional application No. 61/792,590, filed on Mar. 15, 2013.

(51) Int. Cl.
| | |
|---|---|
| *C04B 28/14* | (2006.01) |
| *C04B 14/06* | (2006.01) |
| *C04B 28/10* | (2006.01) |
| *C04B 111/00* | (2006.01) |
| *C04B 111/72* | (2006.01) |

(52) U.S. Cl.
CPC ............... *C04B 28/14* (2013.01); *C04B 28/10* (2013.01); *C04B 28/145* (2013.01); *C04B 2111/00517* (2013.01); *C04B 2111/00663* (2013.01); *C04B 2111/72* (2013.01)

(58) Field of Classification Search
CPC ...... C04B 14/06; C04B 14/18; C04B 22/064; C04B 22/066; C04B 22/143; C04B 28/10; C04B 28/145; C04B 28/14; C04B 2111/00517; C04B 2111/00663
USPC .................................................. 106/788, 796
See application file for complete search history.

(56) References Cited

U.S. PATENT DOCUMENTS

| | | | | |
|---|---|---|---|---|
| 5,177,924 A | * | 1/1993 | Kakuk | 52/606 |
| 2002/0157573 A1 | * | 10/2002 | Pellett | 106/400 |

FOREIGN PATENT DOCUMENTS

WO    WO2009-052997 A1 *  4/2009    .............. C04B 14/24

OTHER PUBLICATIONS

Derwent-Acc.-No: 1988-055322, abstract of Soviet Union Patent Specification No. SU 1323553 A (Jul. 1987).*
Derwent-Acc.-No: 1989-251089, abstract of Hungarian Patent Specification No. HU 48910 T (Jul. 1989).*
Derwent-Acc-No: 2008-H54380, abstract of Russian Patent Specification No. RU 2328477 C1 (Jul. 2008).*

* cited by examiner

*Primary Examiner* — Anthony J Green
(74) *Attorney, Agent, or Firm* — Roberts Mlotkowski Safran & Cole, P.C.; Susanne M. Hopkins

(57) ABSTRACT

Provided are plaster patching compositions including lime, sand, perlite and gypsum. Also provided are methods of making and using the compositions to reproduce, preserve, and/or repair plaster, for example, historic plaster.

20 Claims, No Drawings

PLASTER PATCHING COMPOSITIONS AND METHODS FOR MAKING AND USING SAME

This application claims the benefit of U.S. Provisional Application No. 61/792,590, filed on Mar. 15, 2013 and which is incorporated herein by reference.

FIELD

The present subject matter relates to improved plaster patching compositions and methods of making and using same to, for example, reproduce, preserve and/or repair plaster, for example, historic plaster.

BACKGROUND

Plasters, including lime plasters, have been used in construction for thousands of years everywhere from Japan to Europe. Lime plasters are ideal candidates for repair, because they crystallize over a long period of time, are flexible, and resist water damage. With maintenance, lime plaster will not only last forever but will actually get better with age.

Specifically described are methods for repairing, restoring, and preserving the integrity of historical and ornamental plasters, such as lime plasters, gypsum plaster, and Portland cement plaster, as well as additional structures and materials. These methods can likewise be used for new assembly, wherein original structures are constructed from newly manufactured materials. The following description is particularly focused on the example of repairing lime plasters, though the same techniques are to be used with the repair and assembly of other materials.

SUMMARY

Specifically described are compositions and methods for repairing, restoring, and preserving the integrity of historical and ornamental plasters, such as lime plasters, gypsum plaster, and Portland cement plaster, as well as additional structures and materials. These compositions and methods can likewise be used for new assembly, wherein original structures are constructed from newly manufactured materials. The following description is particularly focused on the example of repairing lime plasters (i.e. historic plasters), though the same techniques are to be used with the repair and assembly of other materials.

The present subject matter is directed to a plaster patching composition that provides enhanced properties including strength, flexibility, and structural identity, as well as ease of use. The present compositions provide quick green strength of a hydraulic set (gypsum) with the long term flexibility, transpiration and water resistance of a lime plaster.

The presently described subject matter is directed to plaster patching composition, comprising or consisting of lime in an amount of from about 20 to about 40 wt %; sand in an amount of from about 30 to about 50 wt %; perlite in an amount of from about 4 to about 10 wt %; and gypsum in an amount of from about 12 to about 32 wt %.

The presently described subject matter is directed to plaster patching composition, comprising a consisting of lime comprising calcium magnesium hydroxide in an amount of from about 5 to about 16 wt %, and calcium magnesium hydroxide oxide in an amount of from about 5 to about 16 wt %; crystalline silica in an amount of from about 34 wt % to about 48 wt %; perlite in an amount of from about 2 wt % to about 12 wt %; and calcium sulfate hemihydrates in an amount of from about 12 wt % to about 32 wt %.

The presently described subject matter is directed to a plaster patching composition, comprising or consisting of lime comprising calcium magnesium hydroxide in an amount of from about 5 to about 16 wt %, calcium magnesium hydroxide oxide in an amount of from about 5 to about 16 wt %, optionally calcium hydroxide in an amount of from about 3 to about 8 wt %, and optionally magnesium hydroxide in an amount of from about >0 to about 6 wt %, optionally crystalline silica in an amount of <0.1 wt %; crystalline silica in an amount of from about 34 wt % to about 48 wt %; perlite in an amount of from about 2 wt % to about 12 wt %; and calcium sulfate hemihydrates in an amount of from about 12 wt % to about 32 wt %.

The presently described subject matter is directed to a dry pre-mix plaster patching composition, consisting of lime consisting of calcium magnesium hydroxide in an amount of from about 5 to about 16 wt %, calcium magnesium hydroxide oxide in an amount of from about 5 to about 16 wt %, optionally calcium hydroxide in an amount of from about 3 to about 8 wt %, optionally magnesium hydroxide in an amount of from about >0 to about 6 wt %, and optionally crystalline silica in an amount of <0.1 wt %; crystalline silica in an amount of from about 34 wt % to about 48 wt %; perlite in an amount of from about 2 wt % to about 12 wt %; and calcium sulfate hemihydrate in an amount of from about 12 wt % to about 32 wt %.

The presently described subject matter is directed to a plaster patching composition, wherein the composition is a pre-mix composition in the form of a dry powder.

The presently described subject matter is directed to a method of making the plaster patching composition, comprising or consisting of blending together the lime, crystalline silica, perlite and calcium sulfate hemihydrate under ambient conditions, to produce a uniform dry powder pre-mix patching plaster composition.

The presently described subject matter is directed to a method of constituting the described plaster patching composition, comprising or consisting of blending a desired quantity of the uniform dry powder pre-mix patching plaster composition with a diluent in an amount sufficient to produce a patching plaster patching paste having a viscosity of from about 200,000 to about 300,000 cp.

The presently described subject matter is directed to a method of constituting the described plaster patching composition, wherein the viscosity is from about 225,000 to about 275,000 cp.

The presently described subject matter is directed to a method of constituting the described plaster patching composition, wherein the viscosity is about 250,000 cp.

The presently described subject matter is directed to a method of making a plaster patching composition, comprising or consisting of blending together lime, crystalline silica, perlite and calcium sulfate hemihydrate under ambient conditions, to produce a uniform dry powder patching plaster composition, and adding water in an amount sufficient to produce a patching plaster composition having a viscosity of from about 200,000 to about 300,000 cp.

The presently described subject matter is directed to a method of making a plaster patching composition, wherein the viscosity is from about 225,000 to about 275,000 cp.

The presently described subject matter is directed to a method of making a plaster patching composition, wherein the viscosity is about 250,000 cp.

The presently described subject matter is directed to a method wherein calcium magnesium hydroxide is present in an amount of from about 7 to about 14 wt %, calcium magnesium hydroxide oxide is present in an amount of from about 7 to about 14 wt %, calcium hydroxide is present in an amount of from about 3 to about 7 wt %, magnesium hydroxide is present in an amount of from about 2.5 to about 4.5 wt %, magnesium oxide is present in an amount of from about 2.5 to about 4.5 wt %, first crystalline silica in the lime is present in an amount of from 0 to <0.1 wt %, second crystalline silica is present in an amount of from about 39 wt % to about 43 wt %, perlite is present in an amount of from about 6 wt % to about 8 wt %, and calcium sulfate hemihydrate is present in an amount of from about 20 wt % to about 24 wt %.

The presently described subject matter is directed to a method, wherein calcium magnesium hydroxide is present in an amount of from about 10 to about 14 wt %, calcium magnesium hydroxide oxide is present in an amount of from about 10 to about 14 wt %, calcium hydroxide is present in an amount of from about 4 to about 8 wt %, magnesium hydroxide is present in an amount of from about 0 to about <0.1 wt %, magnesium oxide is present in an amount of from about 0 to about <0.1 wt %, first crystalline silica in the lime is present in an amount of 0 to about <0.1 wt %, second crystalline silica is present in an amount of from about 39 wt % to about 43 wt %, perlite is present in an amount of from about 6 wt % to about 8 wt %, and calcium sulfate hemihydrate is present in an amount of from about 20 wt % to about 24 wt %.

The presently described subject matter is directed to a method wherein calcium magnesium hydroxide is present in an amount of about 9.2 wt %, calcium magnesium hydroxide oxide is present in an amount of about 9.2 wt %, calcium hydroxide is present in an amount of about 4.6 wt %, magnesium hydroxide is present in an amount of about 3.5 wt %, magnesium oxide is present in an amount of about 3.5 wt %, first crystalline silica in the lime is optionally present in an amount of from 0 to about <0.1 wt %, second crystalline silica is present in an amount of about 41 wt %, perlite is present in an amount of about 7 wt %; and calcium sulfate hemihydrates is present in an amount of about 22 wt %.

The presently described subject matter is directed to a method, wherein calcium magnesium hydroxide is present in an amount of about 12 wt %, calcium magnesium hydroxide oxide is present in an amount of about 12 wt %, calcium hydroxide is present in an amount of about 6 wt %, magnesium hydroxide is optionally present in an amount of from 0 to about <0.1 wt %, magnesium oxide is optionally present in an amount of from 0 to about <0.1 wt %, first crystalline silica in the lime is optionally present in an amount of from 0 to about <0.1 wt %, second crystalline silica is present in an amount of about 41 wt %, perlite is present in an amount of about 7 wt %; and calcium sulfate hemihydrates is present in an amount of about 22 wt %.

The presently described subject matter is directed to a plaster patching composition, wherein the lime comprises calcium magnesium hydroxide in an amount of from about 5 to about 16 wt %, and calcium magnesium hydroxide oxide in an amount of from about 5 to about 16 wt %; the sand comprises second crystalline silica in an amount of from about 34 wt % to about 48 wt %; the perlite is present in an amount of from about 2 wt % to about 12 wt %; and the calcium sulfate hemihydrate is present in an amount of from about 12 wt % to about 32 wt %.

The presently described subject matter is directed to a plaster patching composition, comprising or consisting of lime in an amount of from about 25 to about 35 wt %; sand in an amount of from about 36 to about 46 wt %; perlite in an amount of from about 5 to about 9 wt %; and gypsum in an amount of from about 17 to about 27 wt %.

The presently described subject matter is directed to a plaster patching composition, comprising or consisting of lime in an amount of from about 29 to about 31 wt %; sand in an amount of from about 39 to about 43 wt %; perlite in an amount of from about 6 to about 8 wt %; and gypsum in an amount of from about 21 to about 23 wt %.

The presently described subject matter is directed to a plaster patching composition, comprising or consisting of lime in an amount of 30 wt %; sand in an amount of about 41 wt %; perlite in an amount of about 7 wt %; and gypsum in an amount of about 22 wt %.

The presently described subject matter is directed to a method of repairing plaster, comprising or consisting of stabilizing any loose plaster and/or lath in an area to be repaired, the area having a surface; and applying a first coat of the described plaster patching composition to the area.

DETAILED DESCRIPTION

Definitions

The term "about" as used herein refers to a quantity, level, value, dimension, size, or amount that varies to some extent based on the context in which it is used. For example, such variation can be by as much as 5%. At the least, each numerical parameter can be construed in light of the number of reported significant digits and by applying ordinary rounding techniques.

The term "plaster patching" as used herein refers to the presently described composition for reproducing, preserving and/or repairing plaster, for example, original and historic plaster, including for example interior plaster and historic interior plaster. For example the presently described patching plaster can be used to in-fill historic plaster to its lath. The patching plaster can be prepared and stored as a dry-mix, for example, in a kit, for constitution with a diluent, for example, water, prior to use. The term "lime plaster" and the term "historic plaster" are used interchangeably herein. The term "plaster patching composition" and "patching plaster composition" are used interchangeably herein.

The phrase "plaster patching dry powder pre-mix" as used herein refers to the presently described composition that includes all dry ingredients and does not include a diluent, for example, water.

The phrase "plaster patching ready-to-use" as used herein refers to the present plaster patching composition including a diluent, for example, water, which composition is ready-to-use.

The term "aggregate" refers to the sand and perlite components of the presently described patching plaster.

The phrase "calcium magnesium hydroxide," $(CaMg(OH)_4)$ as used herein refers to a chemical composition commonly known as "lime or hydrated lime" having, for example, CAS No: 39445-23-3.

The phrase "calcium magnesium hydroxide oxide" $(Ca(OH)_2MgO)$ as used herein refers to a chemical composition commonly known as "lime or hydrated lime" having, for example, CAS No: 58398-71-3.

The phrase "calcium hydroxide" as used herein refers to a chemical composition, for example, a component of lime, having CAS No: 1305-62-0.

The phrase "magnesium hydroxide" $(Mg(OH_2))$ as used herein refers to a chemical composition, for example, a component of lime, having CAS No: 1309-42-8.

The phrase "magnesium oxide" (MgO) as used herein refers to a chemical composition, for example, a component of lime, having CAS No: 1309-48-4.

The phrase "crystalline silica" as used herein refers to a composition, commonly known as "silicon dioxide or $SiO_2$,"

that can be in the form of quartz, and is also known as "sand," for example, crystalline silica, quartz, having for example, CAS No: 14808-60-7. Suitable sand or crystalline silica for use in the present compositions can conform with ASTM C144.

The term "perlite" as used herein refers to a composition that is an amorphous volcanic glass that can have a relatively high water contentment and can be formed by the hydration of obsidian. Suitable perlite for use in the presently described compositions include perlite having, for example, CAS No: 93763-70-3. Generally, the composition of perlite can be as follows: 70-75% silicon dioxide: $SiO_2$; 11-15% aluminium oxide: $Al_2O_3$; 2-4% sodium oxide: $Na_2O$; 2-6% potassium oxide: $K_2O$; 0.5-4% iron oxide: $Fe_2O_3$; 0.1-0.7% magnesium oxide: MgO; 0.1-1.5% calcium oxide: CaO; and 3-5% bound water. Perlite has a refractive index of 1.5, free moisture max of 0.5%, pH (water slurry) of from about 6.5 to 8.0; specific gravity of about 2.2 to 2.4; bulk density (loose weight) of about 32 to 400 kg/m$^3$; softening point of from 871 to 1093° C.; fusion point of from 1260 to 1343° C.; and a specific heat of 837 J/kg·K; thermal conductivity at 24° C. of 0.04-0.06 W/m·K.

The phrase "calcium sulfate hemihydrates," i.e., $CaSO4.\frac{1}{2}H_2O$, as used herein refers to a composition commonly known as "gypsum" having, for example, CAS No: 26499-65-0.

As used herein, the term "diluent" refers to an inert substance used to dilute another substance. Suitable diluents for use in the presently described compositions include water.

As used herein the term "trace amount" refers to an amount of a component present in a composition below a detectable amount. An undetectable amount of a component for the purposes of the presently described compositions is an amount at or below 0.1 wt %.

Any concentration ranges, percentage range, or ratio range recited herein are to be understood as expressly disclosing and including any concentrations, percentages or ratios of any integer within that range and fractions thereof, such as one tenth and one hundredth of an integer, and any sub-range falling within a range, unless otherwise indicated.

Any number range recited herein relating to any physical feature, including for example, size or thickness, are to be understood as expressly disclosing and including any integer or fraction of an integer within a disclosed range, or any sub-range within a disclosed range, unless otherwise indicated.

It should be understood that the terms "a" and "an" as used above and elsewhere herein refer to "one or more" of the enumerated components. It will be clear to one of ordinary skill in the art that the use of the singular includes the plural unless specifically stated otherwise. Therefore, the terms "a," "an" and "at least one" are used interchangeably in this application. For example, "a" thickener refers to both one thickener, or a mixture comprising two or more thickeners.

For the purpose of clarity, any element or feature of any method or composition or process described herein, can be combined with any other element or feature of any other method or composition or process described herein.

Throughout the application, descriptions of various embodiments use "comprising" language; however, it will be understood by one of skill in the art, that in some specific instances, an embodiment can alternatively be described using the language "consisting essentially of" or "consisting of."

Other terms as used herein are meant to be defined by their well-known meanings in the art.

Plaster Patching Compositions:

The present plaster patching compositions can comprise or consist of lime which can include calcium magnesium hydroxide and calcium magnesium hydroxide oxide, and optionally one or more of calcium hydroxide, magnesium hydroxide, and magnesium oxide; sand, for example crystalline silica, quartz; perlite; and gypsum, for example calcium sulfate hemihydrate.

The present compositions can be in the form of a dry powder pre-mix that is shelf stable for extended periods of time. The present dry powder pre-mix compositions can be constituted with a diluent, including for example, water, to produce the present plaster patching composition ready for use.

In the present plaster patching compositions, lime can be present in an amount of from about 10 wt % to about 50 wt %; from about 12 wt % to about 48 wt %; from about 14 wt % to about 46 wt %; from about 16 wt % to about 44 wt %; from about 18 wt % to about 42 wt %; from about 20 wt % to about 40 wt %; from about 22 wt % to about 38 wt %; from about 24 wt % to about 36 wt %; from about 25 wt % to about 35 wt %; from about 26 wt % to about 34 wt %; from about 27 wt % to about 33 wt %; from about 28 wt % to about 32 wt %; from about 29 wt % to about 31 wt %; about 25 wt %; about 26 wt %; about 27 wt %; about 28 wt %; about 29 wt %; about 30 wt %; about 31 wt %; about 32 wt %; about 33 wt %; about 34 wt %; or about 35 wt %, or any range or sub-range, or any range including any forgoing point or end point.

Calcium magnesium hydroxide ($CaMg(OH)_4$) and calcium magnesium hydroxide oxide ($Ca(OH)_2MgO$) can each independently be present in the lime component of the presently described plaster patching composition, in an amount of from about 3 wt % to about 20 wt %; from about 4 wt % to about 18 wt %; from about 5 wt % to about 16 wt %; from about 6 wt % to about 14 wt %; from about 6.5 wt % to about 13 wt %; from about 7 wt % to about 12 wt %; from about 7.5 wt % to about 11 wt %; from about 8 wt % to about 10 wt %; from about 8 wt % to about 10.5 wt %; from about 8.5 wt % to about 10 wt %; from about 8.5 wt % to about 9.5 wt %; about 6 wt %; about 7 wt %; about 7.5 wt %; about 8 wt %; about 8.5 wt %; about 9 wt %; about 9.2 wt %; about 9.5 wt %; about 10 wt %; about 10.5 wt %; about 11 wt %; about 12 wt %; about 12.5 wt %; about 13 wt %; about 13.5 wt %; or about 14 wt %; or any range or sub-range, or any range including any forgoing point or end point. Suitable calcium magnesium hydroxide for use in the present plaster patching compositions can include calcium magnesium hydroxide having CAS No: 39445-23-3. Suitable calcium magnesium hydroxide oxide for use in the present plaster patching compositions can include calcium magnesium hydroxide oxide having CAS No: 58398-71-3.

Calcium hydroxide ($Ca(OH)_2$) can be or can optionally be present in the lime component of the presently described plaster patching composition, in an amount of from about 1 wt % to about 12 wt %; from about 2 wt % to about 11 wt %; from about 2.5 wt % to about 10.5 wt %; from about 2 wt % to about 10 wt %; from about 2.5 wt % to about 9 wt %; from about 3 wt % to about 8 wt %; from about 3.5 wt % to about 7.5 wt %; from about 4 wt % to about 7 wt %; about 3 wt %; about 3.5 wt %; about 4 wt %; about 4.5 wt %; about 4.6 wt %; about 5 wt %; about 5.5 wt %; about 6 wt %; about 6.5 wt %; about 7 wt %; about 7.5 wt %; or about 8 wt %; or any range or sub-range, or any range including any forgoing point or end point. Suitable calcium hydroxide for use in the present plaster patching compositions can include calcium magnesium hydroxide oxide having CAS No: 1305-62-0.

Magnesium hydroxide (Mg(OH$_2$)) and magnesium oxide (MgO) can each independently be or optionally independently be present in the lime component of the presently described plaster patching composition, in an amount of from about 0 wt % to about 9 wt %; from about >0 wt % to about 9 wt %; from about >0 wt % to about 0.05 wt %; from about >0 wt % to about 0.1 wt %; from about >0 wt % to about 0.2 wt %; from about >0 wt % to about 0.3 wt %; from about >0 wt % to about 0.5 wt %; from about >0 wt % to about 1 wt %; from about >0 wt % to about 1.5 wt %; from about >0 wt % to about 2 wt %; from about >0 wt % to about 2.5 wt %; from about 0.5 wt % to about 9 wt %; from about 1 wt % to about 8 wt %; from about 1.5 wt % to about 7 wt %; from about 2 wt % to about 6 wt %; from about 2.5 wt % to about 5 wt %; from about 3 wt % to about 4 wt %; from about 3.2 to about 3.8; about 2 wt %; about 2.5 wt %; about 3 wt %; about 3.5 wt %; about 4 wt %; about 4.5 wt %; about 5 wt %; or about 5.5 wt %, or any range or sub-range, or any range including any forgoing point or end point. Suitable magnesium hydroxide for use in the present plaster patching compositions can include magnesium hydroxide having CAS No: 1309-42-8. Suitable magnesium oxide for use in the present plaster patching compositions can include magnesium oxide having CAS No: 1309-48-4.

Suitable lime compositions for use in the present compositions can comprise or consist of or consist essentially of, for example, calcium magnesium hydroxide in an amount of about 9.2 wt %; calcium magnesium hydroxide oxide in an amount of about 9.2 wt %; calcium hydroxide in an amount of about 4.6 wt %; magnesium hydroxide in an amount of about 3.5 wt %; magnesium oxide in an amount of about 3.5 wt %; optionally crystalline silica in trace amounts, for example, in an amount of from 0 to about 0.2 wt %.

Suitable lime compositions for use in the present compositions can comprise or consist of or consist essentially of, for example, calcium magnesium hydroxide in an amount of about 12 wt %; calcium magnesium hydroxide oxide in an amount of about 12 wt %; calcium hydroxide in an amount of about 6 wt %; and optionally one or more of magnesium hydroxide, magnesium oxide and crystalline silica, each independently in trace amounts, for example, each independently present in an amount of from 0 to about 0.2 wt %, from 0 to about 0.1 wt %, or from 0 to about 0.05 wt %.

Sand, for example crystalline silica, for example, crystalline silica quartz, can be present in the present plaster patching compositions in an amount of from about 20 wt % to about 62 wt %; from about 22 wt % to about 60 wt %; from about 24 wt % to about 58 wt %; from about 26 wt % to about 56 wt %; from about 28 wt % to about 54 wt %; from about 28 wt % to about 52 wt %; from about 30 wt % to about 50 wt %; from about 31 wt % to about 51 wt %; from about 32 wt % to about 48 wt %; from about 34 wt % to about 46 wt %; from about 34 wt % to about 48 wt %; from about 36 wt % to about 44 wt %; from about 36 wt % to about 46 wt %; from about 37 wt % to about 43 wt %; from about 38 wt % to about 43 wt %; from about 39 wt % to about 42 wt %; from about 40 wt % to about 42 wt %; about 37 wt %; about 38 wt %; about 39 wt %; about 40 wt %; about 41 wt %; about 42 wt %; about 43 wt %; about 44 wt %; or about 45 wt %, or any range or sub-range, or any range including any forgoing point or end point. Suitable crystalline silica, quartz, for use in the present plaster patching compositions can include crystalline silica, quartz, having CAS No: 14808-60-7.

Perlite can be present in the present plaster patching compositions in an amount of from about 0.5 wt % to about 14 wt %; from about 1 wt % to about 13 wt %; from about 2 wt % to about 12 wt %; from about 3 wt % to about 11 wt %; from about 4 wt % to about 10 wt %; from about 5 wt % to about 9 wt %; from about 6 wt % to about 8 wt %; from about 6.5 wt % to about 7.5 wt %; about 4 wt %; about 4.5 wt %; about 5 wt %; about 5.5 wt %; about 6 wt %; about 6.5 wt %; about 7 wt %; about 7.5 wt %; about 8 wt %; about 8.5 wt %; about 9 wt %; about 9.5 wt %; or about 10 wt %, or any range or sub-range, or any range including any forgoing point or end point. Suitable perlite for use in the present plaster patching compositions can include perlite having CAS No: 93763-70-3.

Gypsum, for example calcium sulfate hemihydrate, can be present in the present plaster patching compositions in an amount of from about 8 wt % to about 36 wt %; from about 10 wt % to about 34 wt %; from about 12 wt % to about 32 wt %; from about 13 wt % to about 31 wt %; from about 14 wt % to about 30 wt %; from about 15 wt % to about 29 wt %; from about 16 wt % to about 28 wt %; from about 17 wt % to about 27 wt %; from about 18 wt % to about 26 wt %; from about 19 wt % to about 25 wt %; from about 20 wt % to about 24 wt %; from about 21 wt % to about 23 wt %; from about 21.5 wt % to about 22.5 wt %; about 18 wt %; about 19 wt %; about 19.5 wt %; about 20 wt %; about 20.5 wt %; about 21 wt %; about 21.5 wt %; about 22 wt %; about 22.5 wt %; about 23 wt %; about 23.5 wt %; about 24 wt %; about 25 wt %; or about 26 wt %, or any range or sub-range, or any range including any forgoing point or end point. Suitable calcium sulfate hemihydrate for use in the present plaster patching compositions can include calcium sulfate hemihydrate having CAS No: 26499-65-0.

The present plaster patching compositions can have a pH (as a saturated solution) of from about 9 to about >15; from about 10 to about 14; from about 11 to about 13; >11; >12; ≥1; ≥12; about 10; about 11; about 12; about 13; about 14; or about 15, or any range or sub-range, or any range including any forgoing point or end point.

The present dry pre-mix plaster patching compositions can have a specific gravity 1.4 to 3.4; from 1.6 to 3.2; from 1.8 to 3; from 2 to 2.8; from 2.1 to 2.7; from 2.2 to 2.6; from 2.3 to 2.5; 2.1; 2.2; 2.3; 2.4; 2.5; 2.6; 2.7; 2.8; 2.9; or 3.0, or any range or sub-range, or any range including any forgoing point or end point.

The present plaster patching compositions can be in the form of a dry powder. Regarding particle size, the present dry powder was screened as follows using a 100 g sample:

| Weight of sample (g) | Screen # pass through |
|---|---|
| 87 | 20 |
| 5.5 | 30 |
| 5.2 | 40 |
| 1.6 | 50 |
| .7 | retained |

The viscosity of the present plaster patching compositions when constituted with a diluent, for example, water, prior to use, can be from about 100,000 to about 350,000 cp; from about 150,000 to about 325,000 cp; from about 200,000 to about 300,000 cp; from about 225,000 to about 275,000 cp; about 200,000 cp; about 210,000 cp; about 220,000 cp; about 230,000 cp; about 240,000 cp; about 250,000 cp; about 260,000 cp; about 270,000 cp; about 280,000 cp; about 290,000 cp; or about 300,000 cp, or any range or sub-range, or any range including any forgoing point or end point.

The presently described compositions can further include one or more of a preservative, a pH adjuster, a stabilizer, an emulsifier, a colouring agent, a fragrance, an accelerating agent (to accelerate set time), and a retarding agent (to retard set time).

The preservatives for use in the presently described compositions can include those described herein, including any known acceptable preservative that functions by inhibiting bacteria and/or fungi, and/or by inhibiting oxidation. Suitable preservatives can include but are not limited to antimicrobial agents and/or antioxidants. Suitable antimicrobial agents can include but are not limited to benzoates, benzyl alcohol, sodium benzoate, sorbates, propionates, and nitrites. Suitable antioxidants can include but are not limited to butylated hydroxytoluene (BHT) and sulphites, as well as any known preservative.

The described preservatives and/or antioxidants can be present in the described compositions in an amount of, for example, from about 0.001 wt % to about 15 wt %; from about 0.01 wt % to about 5 wt %; from about 0.2 wt % to about 4 wt %; from about 0.3 wt % to about 4 wt %; from about 0.4 wt % to about 4 wt %; from about 0.5 wt % to about 4 wt %; from about 0.6 wt % to about 4 wt %; from about 0.7 wt % to about 3 wt %; from about 0.8 wt % to about 2 wt %; from about 0.9 wt % to about 1.5 wt %; from about 0.9 wt % to about 1.1 wt %; about 0.9 wt %; about 1 wt %; or about 1.1 wt % preservative.

If desired, other components can be employed in the present plaster patching compositions, for example in the present plaster patching dry powder pre-mix compositions or in the present plaster patching ready-to-use compositions. The amount and identity of other components that may be combined with the present plaster patching compositions will vary depending upon the particular project and desired outcome. Additional components can include components that affect or do not affect the performance of the present compositions, and can include but are not limited to a coloring agent, a texture agent for example a fiber or particulate, a stabilizer, an emulsifier, a preservative or anti-oxidant, a rheology modifier, an accelerant, a retarding agent, a chemical that indicates when the composition is sufficiently set (for example, by changing color), and an adhesive component. Suitable accelerants that can accelerate the set include, for example, aluminum sulfate. Suitable retardants that can retard the set include, for example, tartaric acid.

After mixing the presently described plaster patching dry pre-mix with a diluent, for example, water, the pot-life of the constituted plaster patching composition is from 15 min. to 1 hour, from 20 minutes to 45 minutes, or about 30 minutes. Over mixing can shorten pot-life.

Consistency and viscosity is sufficient when the constituted plaster patching composition does not fall off the mixing device, for example, blades of a mixer or a trowel, for example, consistency is correct when a ½ layer will not fall off the trowel.

A second layer is used, the first layer will sometimes crack along lath lines, the crack if it has appeared will not telegraph through the second layer, regardless the crack is not structural and is easily filled in with joint compound ALSO the first layer supplies the moisture for the suction as well as some moisture for the crystallization and evaporation, the second layer supplies the moisture for complete crystallization—see the first layer is applied to wood lath and air space (uneven suction), the second layer is applied to masonry (plaster)— (substantially even suction)

Regarding set time, the compositions describe achieve green strength in 1-2 hours, for example, about 1.5 hours, but set time is slower at temperatures below 72 F, and faster at temperatures warmer than 72 F. Set accelerants or retardants can be used at when temperatures are about 55 F or below, or at about 90 F or above, or at about 60 F or below, or at about 85 F or above. Repair can be optimally carried out at temperatures of from 56 F to 89 F, from 60 F to 80 F, from 65 F to 75 F, from 68 F to 75 F, or at about 72 F.

The plaster patching composition can be applied in one to three layers, in one layer, in two layers, or in three-layers. Layers can be about ½ inch thick.

Preparation of Patching Plaster Compositions:

The presently described subject matter relates to the preparation plaster patching compositions, comprising or consisting of blending together lime, crystalline silica, perlite and calcium sulfate hemihydrate under ambient conditions (ambient temperature, light, atmosphere and humidity), to produce a uniform dry powder pre-mix patching plaster composition.

Any undesired residual moisture can be removed from the blended dry powder by drying using methods well know to those of ordinary skill in the art to which the present subject matter pertains.

The presently described subject matter relates to the preparation of plaster patching compositions, comprising or consisting of blending together lime, crystalline silica, perlite and calcium sulfate hemihydrate under ambient conditions, to produce a uniform dry powder patching plaster composition, and adding a diluent, for example, water, in an amount sufficient to produce a thick paste (peanut butter like consistency) ready-to-use plaster patching composition having a viscosity of from about 200,000 to about 300,000 cp, from about 225,000 to about 275,000 cp, or about 250,000 cp.

The amount of water needed to constitute the dry pre-mix plaster patching composition to the described desired consistency, is about 205 ml water to about 454 g plaster patching dry pre-mix±about 20 g, which is roughly equivalent to about one (1) cup of water per about one (1) pound of plaster patching dry pre-mix±0.7 ounces.

Mixing can be accomplished by any means known to the skilled artisan including stirring, shaking, folding, blending, or the like.

The present plaster patching compositions set after application in an amount of time of from about 1 to about 2 hours, depending on environmental conditions, i.e., temperature, heat and humidity.

Methods for Repairing Plaster:

The present plaster patching compositions can be used to reproduce, repair or preserve plaster work, for example original, historic plaster.

The conservation of historic plasters is accomplished through the application of consolidates to friable areas and/or adhesive reattachment by injecting the conditioner and adhesive compositions between the plaster and its lath.

Provided is a method for repairing plaster, comprising or consisting of applying a sufficient amount of the presently described plaster patching composition, for example, the described, dry powder pre-mix plaster patching composition constituted with a diluent for example, water, or the plaster patching composition ready-to-use, to an area or surface to be repaired, for example a void in an area of original plaster where the original plaster is missing, and allow the plaster composition to set. The surface, prior to applying can be stabilized. The plaster patching composition can be applied in a single coat or in multiple coats, for example, one or two coats.

Provided is a method for repairing plaster, comprising or consisting of stabilizing any one or more of loose lath and loose plaster in an area to be repaired; applying the presently described plaster patching composition to the area to be repaired; and allowing the composition to set.

Provided is a method for repairing plaster, comprising or consisting of stabilizing any one or more of loose lath and loose plaster in an area to be repaired; applying a first layer of the presently described plaster patching composition to the area to be repaired; scoring a surface of the first layer; allowing the first layer to set; and applying a second layer of the presently described plaster patching composition onto the set first layer.

Provided is a method for repairing plaster, comprising or consisting of stabilizing any one or more of loose lath and loose plaster in an area to be repaired; applying a first layer of the presently described plaster patching composition to the area to be repaired; scoring a surface of the first layer; allowing the first layer to set; applying a second layer of the presently described plaster patching composition onto the set first layer; allowing the second layer to set; and applying a skim coat of a joint compound onto the set second layer.

Provided is a method for repairing plaster, comprising or consisting of stabilizing any one or more of loose lath and loose plaster in an area to be repaired; applying a first layer of the presently described plaster patching composition to the area to be repaired; scoring a surface of the first layer; allowing the first layer to set; spraying the surface of the set layer first layer with water; applying a second layer of the presently described plaster patching composition onto the set first layer; allowing the second layer to set; and applying a skim coat of a joint compound onto the set second layer.

Provided is a method for repairing plaster, comprising or consisting of stabilizing any one or more of loose lath and loose plaster in an area to be repaired; applying a first layer of the presently described plaster patching composition to the area to be repaired; scoring a surface of the first layer; allowing the first layer to set; removing and/or smoothing any excess plaster from the set first layer; spraying the surface of the set first layer with water; applying a second layer of the presently described plaster patching composition onto the first layer; allowing the second layer to set; applying a skim coat of a joint compound onto the set second layer.

Provided is a method for repairing plaster, comprising or consisting of stabilizing any one or more of loose lath and loose plaster in an area to be repaired; applying a first layer of the presently described plaster patching composition to the area to be repaired; scoring a surface of the first layer; allowing the first layer to set; removing and/or smoothing any excess plaster from the set first layer; spraying the surface of the set first layer with water; applying a second layer of the presently described plaster patching composition onto the first layer; allowing the second layer to set; applying a skim coat of a joint compound onto the set second layer; and smoothing the skim coat comprising sponging the skim coat with a damp sponge.

After the step of stabilizing in any described method, the area to be repaired can be prepared, by for example, removing dust, cleaning, and/or conditioning with a conditioner, for example as described in U.S. Pat. No. 8,362,135 incorporated herein by reference.

Provided is a method for repairing plaster, wherein stabilizing any one or more of loose lath and loose plaster in an area to be repaired; comprises securing loose plaster and/or lath; applying a conditioner composition (as described in U.S. Pat. No. 8,362,135 and incorporated herein by reference) to loose plaster and/or lath in the area to be repaired; applying an adhesive composition (for example, as described in U.S. Pat. No. 8,362,135 and incorporated herein by reference) to loose plaster and/or lath in the area to be repaired, for example, in an amount sufficient to attach loose plaster to the lath (for example, by applying between plaster and lath and/or by drilling holes in plaster and injecting adhesive composition into the drilled holes, and optionally clamping).

Provided is a method for repairing plaster, wherein stabilizing any one or more of loose lath and loose plaster in an area to be repaired; comprises securing loose plaster and/or lath; applying an adhesive composition to loose plaster and/or lath in the area to be repaired, for example, in an amount sufficient to attach loose plaster to the lath; and optionally removing excess adhesive.

Securing can comprise or consist of drilling holes in plaster to be repaired and reattached to lath, and injecting adhesive composition into the drilled holes, and optionally clamping.

Provided is a method for repairing plaster, comprising or consisting of stabilizing any one or more of loose lath and loose plaster in an area to be repaired; preparing the area to be repaired; applying an adhesive composition to loose plaster and lath in the area to be repaired; applying a layer of the presently described plaster patching composition to the area to be repaired; and allowing the plaster patching composition to set.

Stabilization can comprise or consist of securing loose lath and loose plaster, for example by one or more of screwing, nailing, and adhering.

Preparing the area or surface to be repaired can comprise or consist of, for example, cleaning, removing dust, and/or conditioning with a conditioner composition as described in U.S. Pat. No. 8,362,135 incorporated herein by reference in its entirety, the surface can be prepared to enhance bonding of an adhesive composition to the surface.

The present plaster patching composition can be applied in a layer having a thickness of from about ¼ inch to 1.5 inches, from ¼ inch to 1 inch, or at a thickness of about ½ inch.

This lime (historic) plaster restoration procedure is determined, e.g., by the amount of separation of plaster from laths in the interior or exterior of a dwelling or other structure. If the plaster forms the ceiling of a room, and if the plaster separates from laths over time, then the plaster is likely to crack and sag, thereby causing the ceiling to droop downward. This phenomenon can occur with wall surfaces as well.

The stabilization of lime (historic) plaster can include the following four stages: (1) drilling injection ports through the plaster or through the wood laths and inspecting the gap between the plaster and the laths; (2) injecting a conditioner composition from a sprayer into the gap between the plaster and the laths, priming both surfaces; (3) injecting an adhesive composition into the gap; and, (4) bringing the plaster back toward the laths, e.g., by clamping the plaster to the laths (using for example, fasteners including for example, screws and washers) and tightening to insure "soft" contact between the adhesive composition, the plaster, and the lath. The steps can be performed in the order listed above; alternatively, the plaster can be clamped before the injection of the conditioner composition and before the adhesive composition is applied into the gap. Exposed surfaces can be cleaned with a damp soft sponge. The adhesive is allowed to cure (for example, for 24 hours). The washers or braces are then removed. Dried adhesive can be removed with a putty knife or metal window scraper. Drill holes and cracks and voids are then filled with the presently described plaster patching composition.

Repair lath and broken plaster; restoring original, historic plaster: Secure loose lath and loose plaster (by for example mechanically securing or anchoring, or securing using an adhesive, or a combination thereof. Such methods of securing can include one or more of screwing (for example, using a down cup plaster washer; washers; 1.25 in. wood-thread screws, drywall screws, cabinet screws, or deck screws; fender washers, etc.), gluing (using for example, one or more adhesives that can bond, i.e., set in from 1 to 48 hours, for example, overnight), nailing, taping, using mechanical anchors, etc.); Remove dust; Prepare surface (clean, condition, enhance ability to bond to plaster patch); Do adhesive work: Inject adhesive (See U.S. Pat. Nos. 8,362,135 and 8,460,506, incorporated herein by reference in its entirety)) into, for example, drilled holes in plaster to attach loose plaster to lath before patching; Remove excessive adhesive; Clamp if necessary to bring loose plaster into contact with lath; Blend patch plaster premix with water to peanut butter consistency, too loose falls of, too thick falls off blades of blender (mixer with drill or by hand); Apply a $1^{st}$ layer (i.e., "scratch" coat) to (hole, void, area of missing plaster, etc.) surface to be patched (with bucket trowel); Score/texturize the surface of first layer to help a second layer bond to the first layer Allow to set (as used herein, the term "allow to set" refers to a period of time of about 1 or more hours, 2 or more hours, from 1 to 48 hours, from 2 to 20 hours, from 3 to 18 hours, from 4 to 16 hours, from 6 to 14 hours, from 7 to 13 hours, about 8 hours, about 9 hours, about 10 hours, about 11 hours, about 12 hours, or overnight); Remove any clamps or secure means; Remove and trim excess plaster patch as necessary; Mix premix with water (add little at a time); Spray $1^{st}$ set layer with water to enhance bonding; Apply second layer for example with a midget trowel or putty knife; Smooth $2^{nd}$ layer with for example 3 in putty knife; Allow to set; Smooth edges and any uneven surface, for example with a putty knife, eg 3 in.; Skim coat of joint compound commercially available, so thin you can see wall underneath it, readymade, using to fill in any imperfections, can use 2 or 3 coats; Go over with damp sponge eliminates need for sanding and eliminates dust.
Surface Preparation and Method of Application for Filling in Holes Down to the Lath:

Stabilize the perimeter of the hole by reattaching the loose edges of the plaster with BIG WALLY'S PLASTER MAGIC® adhesive repair system (See U.S. Pat. Nos. 8,362,135 and 8,460,506, incorporated herein by reference in their entirety). Afterwards, clean lath surfaces and keyways. Apply BIG WALLY'S PLASTER MAGIC CONDITIONER® (See U.S. Pat. Nos. 8,362,135 and 8,460,506, incorporated herein by reference in their entirety) to all raw plaster surfaces and lath three times, wait ten minutes between applications. Allow to cure overnight. Do not square up the holes; leave them irregular which helps the final appearance of the patch look seamless. Apply patching plaster, for example, in two layers. The first layers gets tucked into and under the edges of the existing plaster and through the keyways, between the laths, then scratch a cross hatch pattern into the surface of the freshly applied plaster with the corner of your putty knife. The first layer should be one-half the thickness of the hole. After the first layer has set (hard to the touch), mix and apply the second layer, pushing it into the scratches of the first layer, filling the patched area completely. Skim with multiple layers (for example, 1 or more layers; 2 or more layers; 3 or more layers; from 1 to 3 layers; from 1 to 7 layers; from 2 to 5 layers; from 1 to 5 layers; from 2 to 4 layers; from 1 to 4 layers; 1 layer; 2 layers; 3 layers; 4 layers or 5 layers) of ready mix joint compound (commercially available), let dry and sand lightly.
Packaging, Stability of Plaster Patching Compositions:

If desired, other components can be employed in the present plaster patching compositions, for example in the present plaster patching dry powder pre-mix compositions or in the present plaster patching ready-to-use compositions. The amount and identity of other components that may be combined with the present plaster patching compositions will vary depending upon the particular project and desired outcome. Additional components can include components that affect or do not affect the performance of the present compositions, and can include but are not limited to a coloring agent, a texture agent for example a fiber or particulate, a stabilizer, an emulsifier, a preservative or anti-oxidant, a rheology modifier, an accelerant, a retarding agent, a chemical that indicates when the composition is sufficiently set (for example, by changing color), and an adhesive component. Suitable accelerants that can accelerate the set include, for example, aluminum sulfate. Suitable retardants that can retard the set include, for example, tartaric acid.

The presently described plaster patching composition can be free from synthetic polymers.

The present plaster patching dry powder pre-mix compositions in accordance with the subject matter described herein may be packaged in, for example, a multi-use or single-use package, including for example, a container or bottle, a jar, a bucket, a pail, a deformable container, for example a paper, plastic, or fabric bag or sack, or the like. For example, the present pre-mix can be packaged in buckets, for example a 1-gallon bucket containing eight pounds of pre-mix which is sufficient to cover 250 square inches, and a 2-gallon bucket containing sixteen pounds of pre-mix which is sufficient to cover 500 square inches, and in sacks containing, for example 25 pounds of pre-mix, 50 pounds or pre-mix, or 100 pounds of pre-mix. The packaged pre-mix can be provided in a kit comprising or consisting of the plaster patching packaged dry pre-mix, instructions, and one or more of a mixing tool; an application tool; a spray bottle; clamping means; fastener means; for example one or more of screws, nails, clamps; a conditioner composition; and an adhesive composition.

Provided is a kit comprising or consisting of plaster patching packaged dry pre-mix, instructions, a conditioner composition, and an adhesive composition.

The present plaster patching compositions in accordance with the subject matter described herein may be provided in a kit comprising or consisting of the present plaster patching composition in a container, and instructions for use, for example written instructions or video instructions for example provided on a DVD, portable drive, or the like.

The present plaster patching ready-for-use compositions in accordance with the subject matter described herein may be packaged in, for example, a single-use package, including for example, a tube, a container or bottle, a bucket, a pail, a jar, or the like.

The present plaster patching compositions, for example constituted ready-to-use and/or dry powder pre-mix compositions, remain stable in storage for periods including up to about 10 years, between about 0.5 months and about 9 years, between about 0.5 months and about 8 years, between about 0.5 months and about 7 years, between about 0.5 months and about 5 years, and alternately any time period between about 6 months and about 4 years, including for 1 week, for 2 weeks, for 3 weeks, for 1 month, for 2 months, for 3 months, for 4 months, for 5 months, for 6 months, for 1 year, for 2 years, for 3 years, for 4 years, for 5 years, for 6 years, for 7 years, for 8 years, for 9 years, for 10 years, or for 10 years or more, or for 1 year or more, or for 5 years or more.

The presently described plaster compositions, for example, patching plaster dry powder pre-mix compositions, in accordance with the subject matter described herein remains stable for at least 10 years at a temperature of less than or equal to 40° C. The presently described topical formulation remains stable for at least 5 years at a temperature of less than or equal to 40° C. The presently described topical formulation remains stable for at least 3 years at a temperature of less than or equal to 40° C. The presently described composition remains stable for at least 7 years at a temperature of less than or equal to 40° C. and at a humidity of up to 75% RH; for at least 5 years at a temperature of less than or equal to 40° C. and at a humidity of up to 75% RH, or for at least 3 years at a temperature of less than or equal to 30° C. and at a humidity of up to 75% RH. The presently described composition in accordance with the subject matter described herein remains stable for an extended period of time when packaged in a container, for example a multi-use container such as a sealable bucket, and exhibits equal to or even greater stability when packaged in a single-use package such as a sealable bucket.

EXAMPLES

The following examples are illustrative of the present compositions and methods, and are not intended to be limitations thereon.

Example 1

Repairing Original Plaster

Surface Preparation and Method of Application for Filling in Holes Down to the Lath Stabilize the perimeter of the void left by missing plaster by reattaching the loose edges of the plaster with BIG WALLY'S PLASTER MAGIC® adhesive repair system (See U.S. Pat. Nos. 8,362,135 and 8,460,506, both incorporated herein by reference in their entirety). Afterwards, clean lath surfaces and keyways. Apply BIG WALLY'S PLASTER MAGIC CONDITIONER® (See U.S. Pat. Nos. 8,362,135 and 8,460,506, both incorporated herein by reference in their entirety to all raw plaster surfaces and lath three times, wait ten minutes between applications. Allow to cure 1 to 2 hours or overnight. Do not square up the holes; leave them irregular which helps the final appearance of the patch look seamless. Apply patching plaster in two layers. The first layers gets tucked into and under the edges of the existing plaster and through the keyways, between the laths, then scratch a cross hatch pattern into the surface of the freshly applied plaster with the corner of your putty knife. The first layer should be one-half the thickness of the hole. After the first layer has set (hard to the touch, about 1 to 2 hours), mix and apply a second layer, pushing it into the scratches of the first layer, filling the patched area completely. Skim with multiple layers of ready mix joint compound, let dry and sponge with a damp sponge or sand lightly.

I claim:

1. A plaster patching composition, comprising:
   lime comprising
      calcium magnesium hydroxide in an amount of from about 5 to about 16 wt %, and
      calcium magnesium hydroxide oxide in an amount of from about 5 to about 16 wt %,
      optionally first crystalline silica present in an amount of 0 to <0.2 wt %;
   sand comprising
      second crystalline silica present in an amount of from about 34 wt % to about 48 wt %;
   perlite present in an amount of from about 2 wt % to about 12 wt %; and
   gypsum comprising
      calcium sulfate hemihydrates present in an amount of from about 12 wt % to about 32 wt %,
   wherein wt % is based on the total weight of the plaster patching composition.

2. A method of making the plaster patching composition of claim 1, comprising:
   blending together lime, perlite, sand, and gypsum, under ambient conditions, to produce a uniform dry powder patching plaster composition, and
   adding water in an amount sufficient to produce a patching plaster composition having a viscosity of from about 200,000 to about 300,000 cp.

3. The method of claim 2, wherein the viscosity is from about 225,000 to about 275,000 cp.

4. The method of claim 3, wherein the viscosity is about 250,000 cp.

5. A method of repairing plaster, comprising:
   stabilizing any loose plaster and/or lath in an area to be repaired, the area having a surface; and
   applying at least a first coat of the plaster patching composition of claim 1 to the area.

6. A plaster patching composition, comprising:
   lime comprising
      calcium magnesium hydroxide in an amount of from about 5 to about 16 wt %,
      calcium magnesium hydroxide oxide in an amount of from about 5 to about 16 wt %,
      optionally calcium hydroxide in an amount of from about 3 to about 8 wt %,
      optionally magnesium hydroxide in an amount of from about >0 to about 9 wt %,
      optionally magnesium oxide in an amount of from about >0 to about 9 wt %, and
      optionally first crystalline silica in an amount of <0.1 wt %;
   second crystalline silica in an amount of from about 34 wt % to about 48 wt %;
   perlite in an amount of from about 2 wt % to about 12 wt; and
   calcium sulfate hemihydrates in an amount of from about 12 wt % to about 32 wt %,
   wherein wt % is based on the total weight of the plaster patching composition.

7. The plaster patching composition of claim 6, wherein the composition is a pre-mix composition in the form of a dry powder.

8. The plaster patching composition of claim 6, wherein
   calcium magnesium hydroxide is present in an amount of from about 7 to about 14 wt %,
   calcium magnesium hydroxide oxide is present in an amount of from about 7 to about 14 wt %,
   calcium hydroxide is present in an amount of from about 3 to about 7 wt %,
   magnesium hydroxide is present in an amount of from about 2.5 to about 4.5 wt %,
   magnesium oxide is present in an amount of from about 2.5 to about 4.5 wt %,
   first crystalline silica in the lime is present in an amount of from 0 to <0.1 wt %,
   second crystalline silica is present in an amount of from about 39 wt % to about 43 wt %,
   perlite is present in an amount of from about 6 wt % to about 8 wt, and
   calcium sulfate hemihydrate is present in an amount of from about 20 wt % to about 24 wt %,
   wherein wt % is based on the total weight of the plaster patching composition.

9. The plaster patching composition of claim 6, wherein
calcium magnesium hydroxide is present in an amount of from about 10 to about 14 wt %,
calcium magnesium hydroxide oxide is present in an amount of from about 10 to about 14 wt %,
calcium hydroxide is present in an amount of from about 4 to about 8 wt %,
magnesium hydroxide is present in an amount of from about 0 to about <0.1 wt %,
magnesium oxide is present in an amount of from about 0 to about <0.1 wt %,
first crystalline silica in the lime is present in an amount of 0 to about <0.1 wt %,
second crystalline silica is present in an amount of from about 39 wt % to about 43 wt %,
perlite is present in an amount of from about 6 wt % to about 8 wt, and
calcium sulfate hemihydrate is present in an amount of from about 20 wt % to about 24 wt %,
wherein wt % is based on the total weight of the plaster patching composition.

10. The plaster patching composition of claim 6, wherein
calcium magnesium hydroxide is present in an amount of about 9.2 wt %,
calcium magnesium hydroxide oxide is present in an amount of about 9.2 wt %,
calcium hydroxide is present in an amount of about 4.6 wt,
magnesium hydroxide is present in an amount of about 3.5 wt %,
magnesium oxide is present in an amount of about 3.5 wt,
first crystalline silica in the lime is optionally present in an amount of from 0 to about <0.1 wt %,
second crystalline silica is present in an amount of about 41 wt %,
perlite is present in an amount of about 7 wt %, and
calcium sulfate hemihydrates is present in an amount of about 22 wt %,
wherein wt % is based on the total weight of the plaster patching composition.

11. The plaster patching composition of claim 6, wherein
calcium magnesium hydroxide is present in an amount of about 12 wt %,
calcium magnesium hydroxide oxide is present in an amount of about 12 wt %,
calcium hydroxide is present in an amount of about 6 wt %,
magnesium hydroxide is optionally present in an amount of from 0 to about <0.1 wt %,
magnesium oxide is optionally present in an amount of from 0 to about <0.1 wt %,
first crystalline silica in the lime is optionally present in an amount of from 0 to about <0.1 wt %,
second crystalline silica is present in an amount of about 41 wt %,
perlite is present in an amount of about 7 wt %, and
calcium sulfate hemihydrates is present in an amount of about 22 wt %,
wherein wt % is based on the total weight of the plaster patching composition.

12. A method of making the plaster patching composition of claim 7, comprising blending together the lime, crystalline silica, perlite and calcium sulfate hemihydrate under ambient conditions, to produce a uniform dry powder pre-mix patching plaster composition.

13. A method of constituting the plaster patching composition of claim 7, comprising:
blending a quantity of the uniform dry powder pre-mix patching plaster composition with a diluent in an amount sufficient to produce a patching plaster patching paste having a viscosity of from about 200,000 to about 300,000 cp.

14. The method of claim 13, wherein the viscosity is from about 225,000 to about 275,000 cp.

15. The method of claim 13, wherein the viscosity is about 250,000 cp.

16. A dry pre-mix plaster patching composition, consisting of:
lime consisting of
calcium magnesium hydroxide in an amount of from about 5 to about 16 wt %,
calcium magnesium hydroxide oxide in an amount of from about 5 to about 16 wt %,
optionally calcium hydroxide in an amount of from about 3 to about 8 wt %,
optionally magnesium hydroxide in an amount of from about >0 to about 6 wt %,
optionally magnesium oxide in an amount of from about >0 to about 9 wt %, and
optionally first crystalline silica in an amount of <0.1 wt %;
second crystalline silica in an amount of from about 34 wt % to about 48 wt %;
perlite in an amount of from about 2 wt % to about 12 wt %; and
calcium sulfate hemihydrate in an amount of from about 12 wt % to about 32 wt %,
wherein wt % is based on the total weight of the plaster patching composition.

17. A plaster patching composition, comprising:
lime present in an amount of from about 20 to about 40 wt %, the lime comprises
calcium magnesium hydroxide present in an amount of from about 5 to about 16 wt %, and
calcium magnesium hydroxide oxide present in an amount of from about 5 to about 16 wt %;
crystalline silica present in an amount of from about 34 wt % to about 48 wt %;
perlite is present in an amount of from about 2 wt % to about 12 wt %; and
calcium sulfate hemihydrate present in an amount of from about 12 wt % to about 32 wt %,
wherein wt % is based on the total weight of the plaster patching composition.

18. A plaster patching composition, comprising:
lime in an amount of from about 25 to about 35 wt %;
sand in an amount of from about 36 to about 46 wt %;
perlite in an amount of from about 5 to about 9 wt %; and
gypsum in an amount of from about 17 to about 27 wt %,
wherein wt % is based on the total weight of the plaster patching composition.

19. The plaster patching composition according to claim 18, wherein
lime is present in an amount of from about 29 to about 31 wt %;
sand is present in an amount of from about 39 to about 43 wt %;
perlite is present in an amount of from about 6 to about 8 wt %; and
gypsum is present in an amount of from about 21 to about 23 wt %,
wherein wt % is based on the total weight of the plaster patching composition.

20. The plaster patching composition according to claim 18, wherein lime is present in an amount of 30 wt %;
sand is present in an amount of about 41 wt %;
perlite is present in an amount of about 7 wt %; and
gypsum is present in an amount of about 22 wt %,
wherein wt % is based on the total weight of the plaster patching composition.

\* \* \* \* \*